United States Patent [19]

Kneisley et al.

[11] Patent Number: 5,166,567
[45] Date of Patent: Nov. 24, 1992

[54] ENGINE WELDER

[75] Inventors: Joel D. Kneisley, Painesville; Don L. Moffett, Jr., Mentor; Dale E. Rawlings, Euclid, all of Ohio

[73] Assignee: The Lincoln Electric Company, Cleveland, Ohio

[21] Appl. No.: 557,754

[22] Filed: Jul. 23, 1990

[51] Int. Cl.$^5$ ............................................. H02K 1/00
[52] U.S. Cl. ..................................... 310/216; 310/179; 310/184; 310/185; 310/187; 310/254; 219/133; 322/25
[58] Field of Search ............... 310/216, 217, 218, 254, 310/259, 179, 184, 180, 261, 186-188, 42, 232; 219/133; 322/25, 52, 62-65

[56] References Cited

U.S. PATENT DOCUMENTS

| | | | |
|---|---|---|---|
| Re. 28,705 | 2/1976 | Hoffmeyer | 310/180 |
| 3,007,068 | 10/1961 | Arnold | 310/254 |
| 3,518,473 | 6/1970 | Nordebo | 310/180 |
| 3,783,318 | 1/1974 | Widstrand | 310/216 |
| 3,899,652 | 8/1975 | Terry | 219/413 |
| 4,085,347 | 4/1978 | Luchius | 310/259 |
| 4,864,177 | 9/1989 | Yang | 310/216 |

FOREIGN PATENT DOCUMENTS

| | | | |
|---|---|---|---|
| 0020204 | 2/1977 | Japan | 310/216 |
| 0116031 | 7/1983 | Japan | 310/216 |
| 0539356 | 12/1973 | U.S.S.R. | 310/216 |

Primary Examiner—R. Skudy

[57] ABSTRACT

In an engine welder of the type including an output alternator having a rotor driven about a central axis with an outwardly facing, cylindrical surface and a stator with a cylindrical surface generally matching said cylindrical surface of the rotor and containing in a number of inwardly opening, circumferentially spaced, axially extending winding slots, wherein the slots include a first group adapted to receive welding current windings and a second group adapted to receive auxiliary power circuit windings. The improvement in this construction involves modifying the first group of slots to include structural means for causing a substantial increase in the flux leakage in the first group of slots, as compared to the flux leakage between the second group of slots. In this manner, the welding output of the engine welder has a substantial internal reactance and the auxiliary power circuit has a reduced internal reactance, all in the same stator. This reduces the necessity for an external reactor in the welding circuit driven by the engine welder and improves the voltage regulation of the auxiliary power circuit.

28 Claims, 6 Drawing Sheets

ENGINE WELDER

This invention relates to the art of electric arc welding and more particularly to an improved engine welder of the type including an output alternator for creating the welding current of the welder. The invention is particularly applicable for an engine welder which is modified to reduce the need for an external reactor in the welding circuit or reduce the size of the needed reactor and it will be described with particular reference to a DC welder; however, the invention has much broader applications and may be used for a variety of engine welders, both DC and AC, wherein the size of the external reactor is substantially reduced if a reactor is required at all.

In some welding installations, the welding current is created by an engine welder wherein an alternator is driven by an internal combustion engine to create the necessary welding current. These engine welders have normally employed somewhat standard alternator technology. To control the characteristics of the voltage/current output curve, a substantial external reactor is placed in the external welding circuit driven by the engine welder. In the past, this external reactor is a relatively large component in the overall welding equipment. The reactor substantially increases the weight of the total installation and thus the ability to move the engine welder from place-to-place. As is well known, the weight of engine welders is a primary consideration for the customer since the engine welder must be somewhat movable and easily transported from various remote locations. When the standard alternator technology is employed, the size of the external reactor can approach 15% of the total weight of the engine welder. Thus, there has been a substantial demand for reducing the weight of the welder without sacrificing the welding capabilities or reducing the quality of the auxiliary power, such as 120 volts of AC power.

THE INVENTION

In accordance with the present invention, there is provided an improvement in an engine welder, which improvement reduces, and generally removes, the need for an external reactor in the welding circuit driven by the engine welder.

In accordance with the present invention, there is provided an improvement in an engine welder of the type including an output alternator having a rotor, driven about a central axis. This type rotor includes an outwardly facing cylindrical surface. The alternator further includes a stator having a cylindrical surface generally matching the cylindrical surface of the rotor and containing a number of inwardly opening, circumferentially spaced, axially extending winding slots with a first group of slots adapted to receive welding current windings and a second group of slots adapted to receive auxiliary power current windings. Each of these slots includes an entrant passage bordered by two spaced tooth tips facing each other. In accordance with the invention, the spaced tooth tips of the first group of slots include structural means for causing a substantial increase in the flux leakage, as compared to the flux leakage between the tooth pieces of the second group of slots. By employing increased flux leaking in the slots carrying the welding current windings, the internal leakage reactance of the stator design is substantially increased. This increases the internal reactance of the engine welder to reduce the need for an external reactor. To further accomplish the increased internal reactance for the external welding circuit, the individual laminations forming the stator have been designed to achieve a substantially higher leakage reactance by using a deeper slot configuration so the windings are spaced substantially from the cylindrical surface of the stator. Thus, the tooth tips facing each other in these particular slots have a substantially increased radial length to, thus, increase the flux leakage between the adjacent tooth tips of the slots into which the welding current windings are mounted on the stator. The increased leakage of the slots for the welding windings can be accomplished by various structural modifications of the slot geometry. The length of the slots can be increased. The width of the slots can be decreased. The ratio of the radial length of the tooth tips to the spacing of the tooth tips for each slot can be increased. Combinations of this modification can be made to render the tooth reactance or leakage reactance of the slots for the welding windings substantially greater than the reactance of the slots for the auxiliary windings.

This improved design for the laminations employed in the stator of the alternator section of an engine welder has proven successful in welding in the range of 50–150 amperes. As the output amperes increase above about 125 amperes, a relatively small external reactor may be needed; however, this external reactor is drastically reduced in size and weight from a reactor required with a standard alternator output stage of an engine welder.

The primary object of the present invention is the provision of a modification in the stator lamination core of the alternator in an engine welder, which modification increases the internal reactance of the welding circuit powered by the welder to reduce the size of the external reactor required to perform a satisfactory welding operation.

Another object of the present invention is the provision of an improved engine welder, as defined above, which engine welder has winding slots in the stator of the alternator stage divided into first and second groups with the first group having an increased internal reactance and the second group having a minimized internal reactance.

Yet another object of the present invention is the provision of an improved engine welder, as defined above, which engine welder can drive a welding installation having a current rating between about 50–150 amperes, with no external reactor, or a relatively small external reactor.

Still a further object of the invention is the provision of an engine welder, as defined above, which engine welder improves the auxiliary voltage regulation from no load to full load.

Another object of the present invention is the provision of an engine welder as defined above, which engine welder reduces the demagnetization effect on the rotor field while welding and reduces the droop of the auxiliary voltage during welding.

Another object of the invention is the provision of an improved engine welder, as defined above, which engine welder generally eliminates the need for an external AC reactor in small machines, up to about 150 amperes, and proportionately reduces the size of the acquired reactor for larger engine welders.

Another object of the invention is the provision of an engine welder, as defined above, which engine welder has the welding windings and auxiliary windings in quadrature and is modified so that the tooth reactance of the welding winding poles are increased and is substantially greater than the tooth reactance of the auxiliary windings. Indeed, the tooth reactance of the auxiliary windings is minimized.

These and other objects and advantages will become apparent from the following description taken together with the accompanying drawings.

PREFERRED EMBODIMENT

Figure 1:
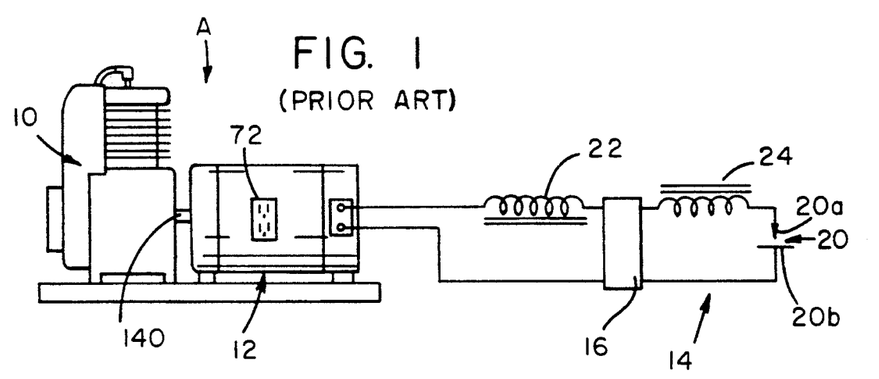
FIG. 1 is a schematic layout of an engine welder.
Figure 2:
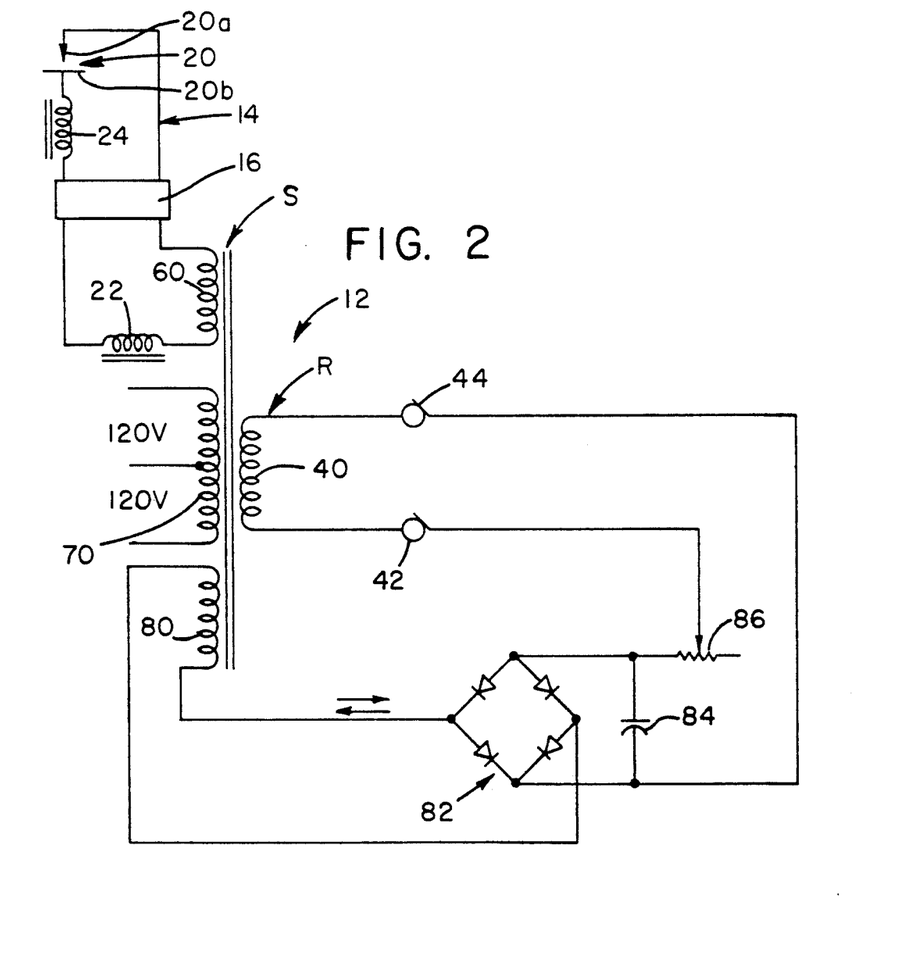
FIG. 2 is a simplified winding diagram of the engine welder shown in FIG. 1.

Referring now to the drawings, wherein the showings are for the purpose of illustrating the preferred embodiment of the invention only, and not for the purpose of limiting same, an engine welder A includes an internal combustion engine 10 for driving an alternator 12 that creates a current for welding in accordance with standard technology. This type of unit is intended to be extremely mobile and any reduction in the total weight of the welder is of extreme importance. Welder A must be manually moved from location to location under various adverse conditions. Thus, one of the main objectives of such a welder is its mobility and, thus, its low weight and low cost. An engine welder generally includes a welding output circuit 14 for directing a current across a welding station 20 including an electrode 20a and a workpiece 20b. In the past, a relatively large reactor 22, which may or may not be a tapped reactor, is connected in series in the output welding circuit 14 and rectifier 16 for the purposes of controlling the voltage/current characteristics across welding station 20 between no load and full load. Circuit 14 also uses a standard choke 24 to control the arc across the welding station. Prior welders, as shown in FIG. 1, have included external reactors 22 which weigh at least about 30% of the total weight of the alternator and reactor combined. An external reactor is needed when employing a standard, prior art alternator design. A selector switch is often required on reactor 22 to adjust the amount of reactance in series with the welding station. This was normally a tapped version of a reactor, which is illustrated schematically as a non-tapped external reactor 22 in FIG. 1. FIG. 2 illustrates the general wiring configuration of alternator 12 driven by internal combustion engine 10. Alternator 12 includes a rotor R onto which is mounted a field winding 40 receiving current through a pair of slip rings 42, 44 in accordance with standard practice. Stator S of alternator 12 includes a welding current winding 60 adapted to be connected through a rectifier 16 to the output welding circuit 14, as previously described. As rotor R is driven by internal combustion engine 10, induced voltage in output welding current winding 60 causes a current flow through rectifier 16, thus, causing a current to flow through the welding station 20. In accordance with somewhat standard practice, an auxiliary output power supply is required for engine welder A. This is in the form of 120 volts or 240 volts AC power created by employing auxiliary output power winding 70 on stator S. Thus, as rotor R is rotated by engine 10, a welding current is created for welding while an appropriate auxiliary power supply is available at the schematically illustrated plug in electrical outlet 72. This power is generated by the induced voltage across winding 70. To apply an appropriate DC exciting field by field winding 40, the stator employs a third winding 80 which directs an alternating current across full wave bridge 82 having an output filter or capacitor 84. The voltage across the filter or capacitor 84 is directed across field winding 40 through an appropriate rheostat 86. In accordance with this design, current adjustment is accomplished by adjusting rheostat 86 for controlling the field winding current flow. In this manner, the output or welding current in circuit 14 is adjusted. As so far described, alternator 12 is constructed substantially in accordance with the prior art.

Figure 3:
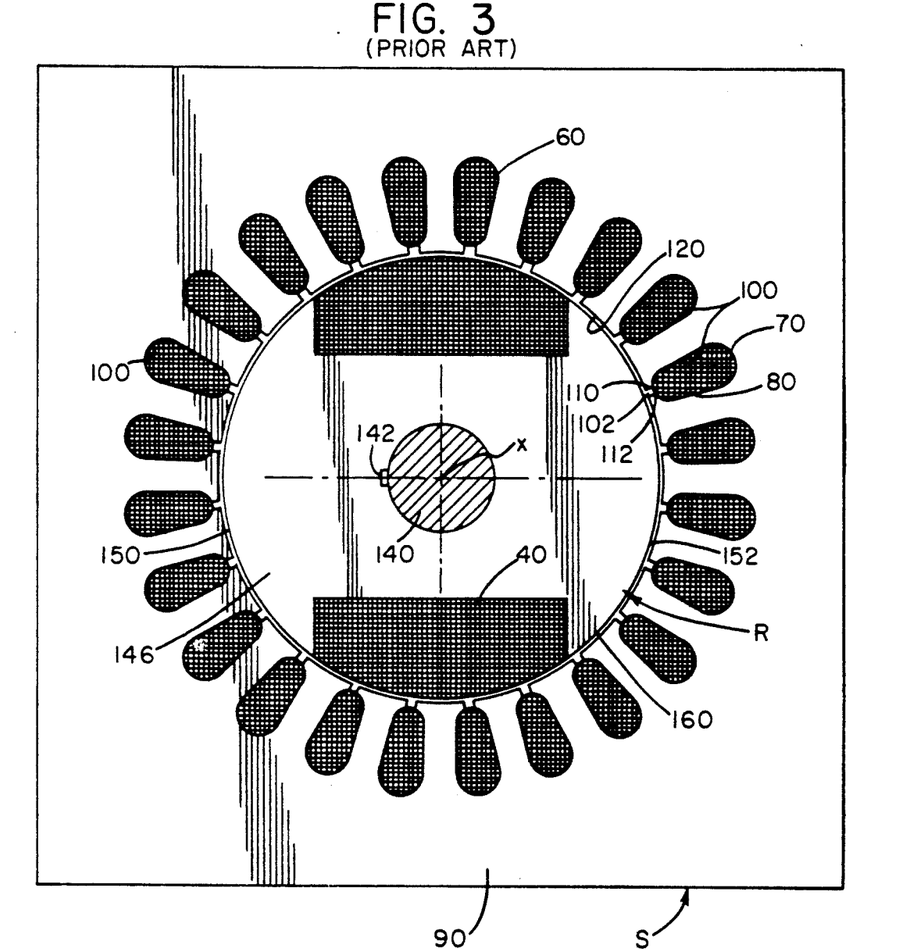
FIG. 3 is an enlarged cross-sectional view through a prior art alternator section for the motor generator shown in FIG. 1.

Referring now to FIG. 3, a cross-section through alternator 12 schematically shown in FIG. 2 is shown as including one of the laminations 90, several of which are stacked together to form the core of stator S in accordance with conventional practice. Laminations 90 includes a number of circumferentially spaced winding slots 100. These slots each includes an entrant passage 102 defined between two spaced tooth tips 110, 112. Slots 100 are spaced around a cylindrical surface 120 defined by a number of laminations 90 stacked together in a direction axially along central axis x of the alternator. Tooth tips 110, 112 are spaced a sufficient distance to allow wrapping of the individual wires forming windings 60, 70 and 80 into the slots in an appropriate arrangement as dictated by the desired output characteristics for the windings. The winding technique and parameters used to construct windings 60, 70 and 80 do not form a part of the present invention and is well known in the alternator art. Also as is well known in the art, windings are often referred to as coils and thus welding current windings 60 can also be referred to as welding current coil 60 etc. and is done so in this specification. Rotor R is driven by engine 10 by an appropriate drive shaft 140 connected to the rotor core formed of laminations 146 by key 142 or by other arrangements. Rotor R includes diametrically opposed, generally arcuate pole pieces 150, 152 having an outer cylindrical surface 160 defined by the axially spaced stack of laminations 146. Cylindrical surface 160 is concentric with the rotating axis x of rotor R and also concentric with the inwardly facing cylindrical surface 120 of stator S. By rotating rotor R about axis x in the cylindrical cavity defined by surface 120, the various windings 60, 70 and 80 are energized in accordance with the level of current flow through field windings 40 on rotor R. Of course, windings 40 are laid on rotor R in accordance with standard practice. The coil layout set forth in FIG. 3 is representative in nature since the invention relates to a modification of the stator S and not a modification of the rotor itself. This component can have any standard configuration. As so far described, alternator 12 is somewhat standard and requires an external relatively large reactor 22. In accordance with the invention, this reactor is eliminated or drastically reduced in size to substantially reduce the cost and weight of the engine generator. In a welder of less than about 150 amperes, no external reactor 22 is used.

Figure 4:
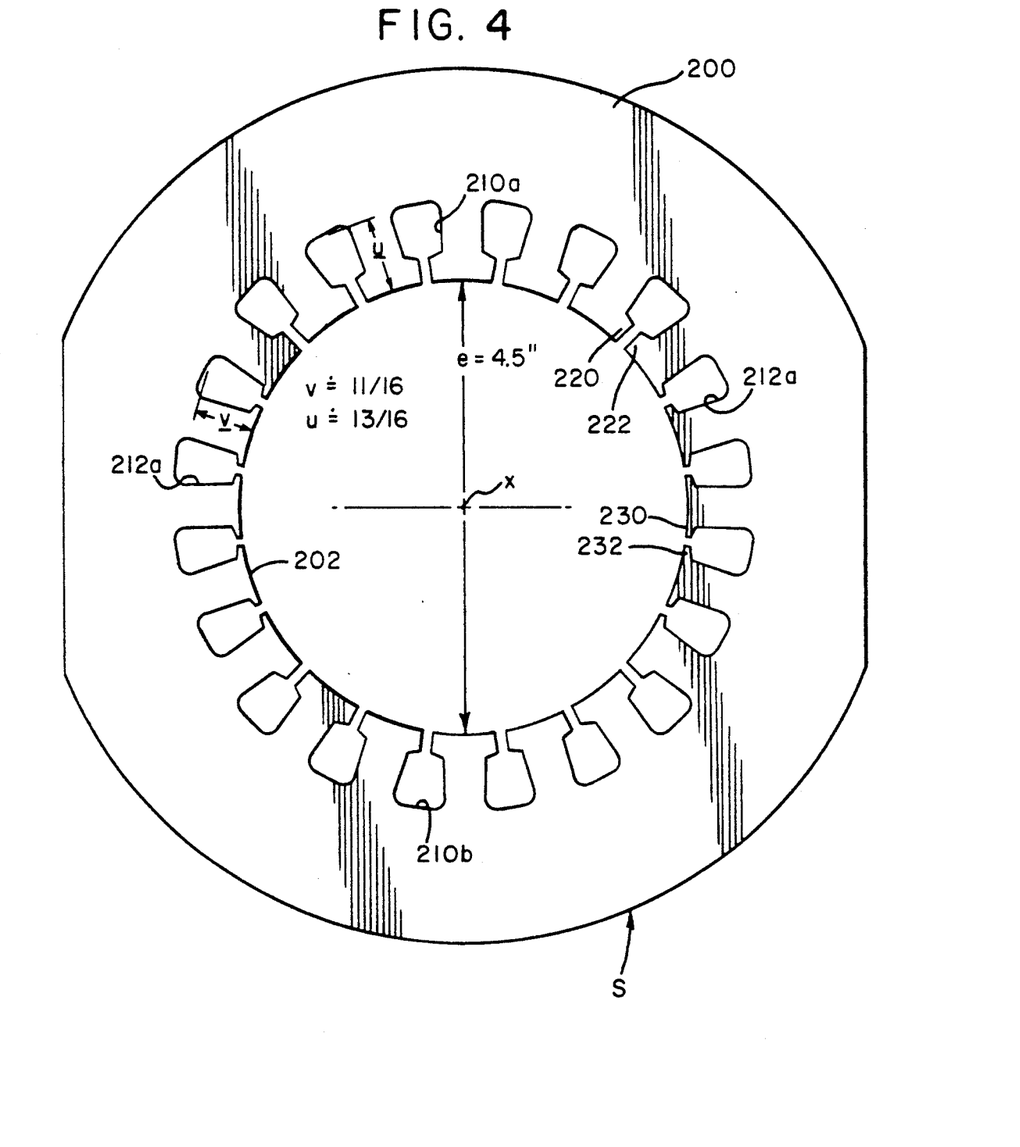
FIG. 4 is an enlarged cross-sectional view of the laminations for the core of a stator constructed in accordance with the present invention.
Figure 5:
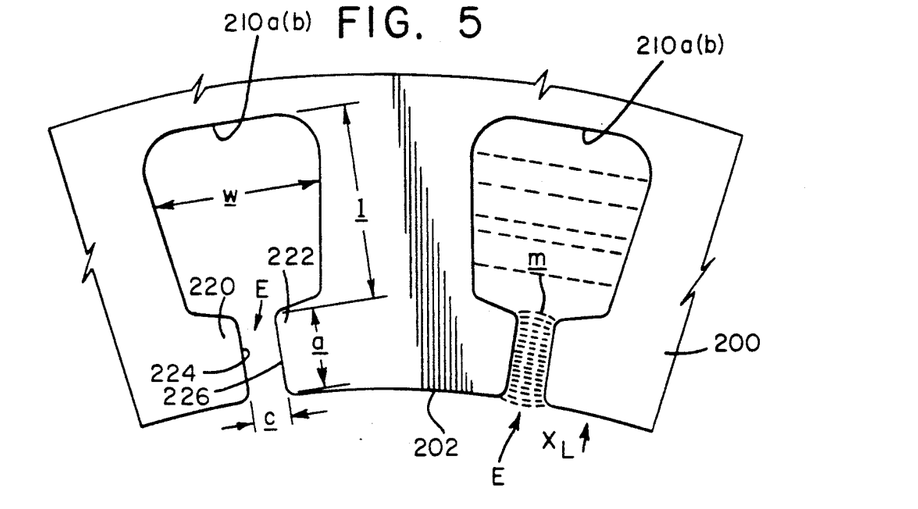
FIGS. 5 and 6 are enlarged partial views showing the slot configuration of the preferred embodiment of the lamination illustrated in FIG. 4.
Figure 6:
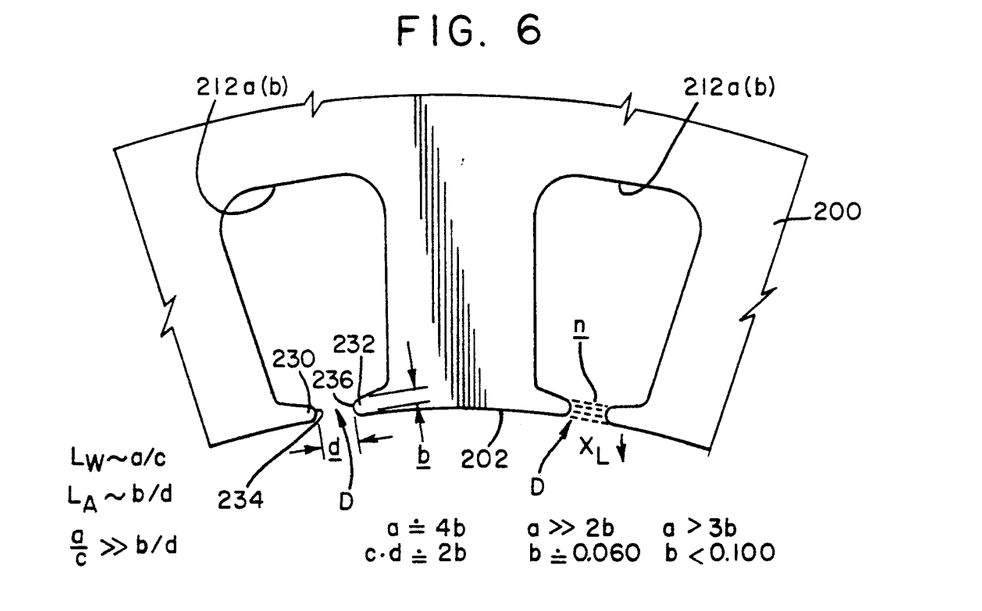
Figure 7:
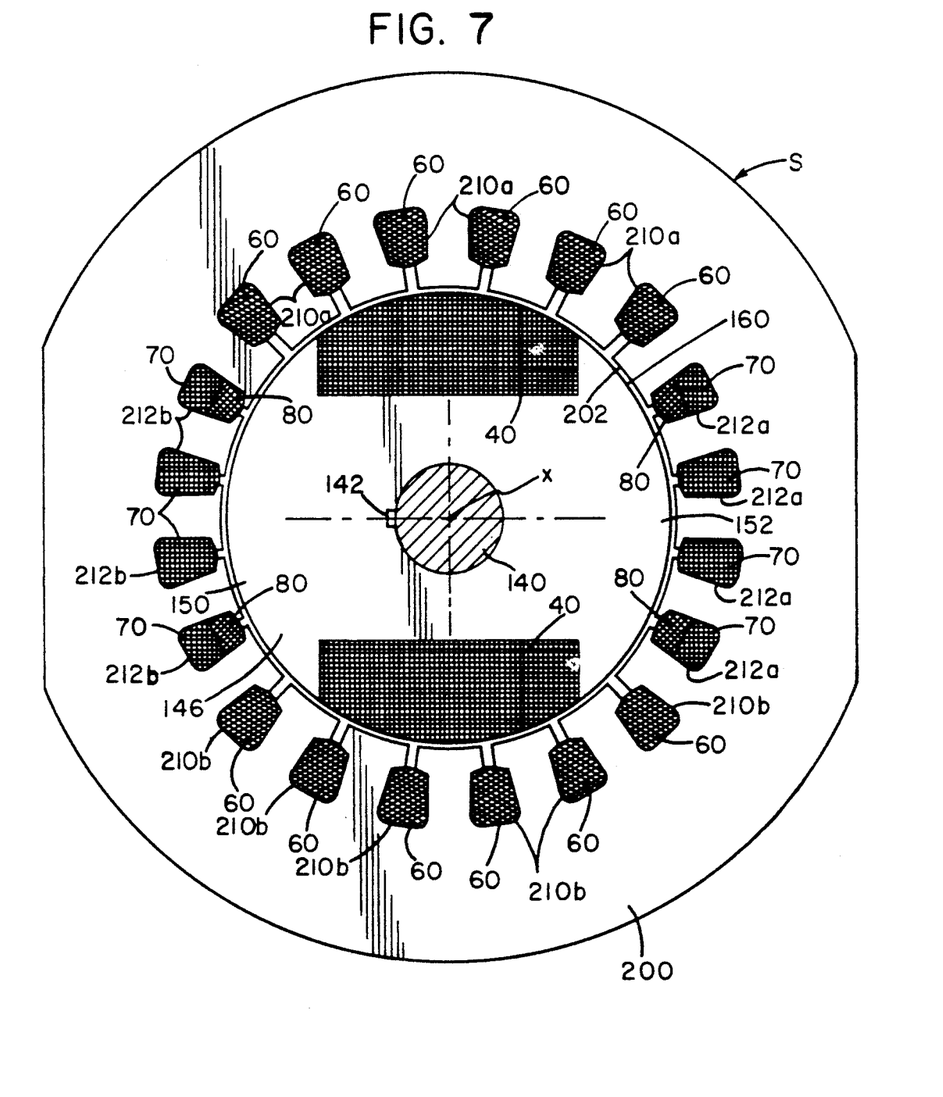
FIG. 7 is a view similar to FIG. 3 illustrating the preferred embodiment of the present invention; and, FIG. 8 is a voltage/current curve for a welder using the present invention showing the improved regulation of the auxiliary power output.

The preferred embodiment of the invention is illustrated in FIGS. 4–7. As best shown in FIG. 7, stator S includes a core formed from a stack of laminations 200 having the illustrated configuration shown in FIG. 4. These laminations are formed from high permeable iron sheet stock with an inwardly facing cylindrical surface 202 concentric to central axis x. A plurality of circumferentially spaced winding receiving slots are divided into a first group of closely spaced slots 210a on one side and 210b on the other side and a second group including slots 212a on one side and 212b on the other side. Twenty equally spaced slots are illustrated having a shape which is dictated by the need to accommodate a specific number of turns or the assembled size of the coils to be laid in each of the slots. All of the slots are illustrated as including the same configuration; however, the various slots could be modified if desired. The number of slots and their outermost configuration to receive the windings is not a part of the invention. The invention relates to a modification in the geometry of the slots such as the shape of the entrant passages for the various slots, or profile of the slots, or the recessed depth of the slots. The entrant passages are required to allow insertion of the various coils or windings within the individual slots. As best illustrated in FIG. 5, the entrant passages for slots 210a, 210b are modified in accordance with the invention to increase the flux leakage of the slot which is primarily the leakage m between the spaced, tooth tip areas 224, 226, also identified as parallel surfaces 224, 226 or interface surfaces 224, 226, defining the entrant passage E. Passage E for the slots in the first group includes oppositely facing tooth tip areas 220, 222 terminating at and defining generally flat, spaced parallel surfaces 224, 226. The width c, also identified as the spacing c or distance c, of entrant passage E is a dimension to allow insertion of the wires forming the windings within the individual slots. In practice, this width c is approximately 0.10 inches. By using parallel surfaces 224, 226 for the tooth tips, the greatest amount of flux leakage m is allowed. The depth a, also identified as width a, of the tooth tips also determines the magnitude of the leakage flux which combines with the use of parallel surfaces to maximize the leakage flux and, thus, the internal inductive reactance of coils or windings 60. The invention is in modifying the slots defined by the stacked laminations 200. In the preferred embodiment, the tooth tips of the slots for receiving the welding current windings are configured to increase the internal inductive reactance of the alternator with respect to the welding current 60, also identified as coils 60 or windings 60. A variety of structural modifications of tooth tip areas 220, 222 could be used for increasing the internal reactance. The width c could be decreased to increase the flux leakage m. Thus, the effective depth a and the effective width c have an effect on the leakage associated with the welding windings 60, as illustrated in FIG. 7, which varies with the ratio of a/c. The leakage flux from welding windings 60 is pictorially depicted by reference letter m in FIG. 5 and quantitatively indicated by the designation $L_W$ in FIG. 6. Also, the leakage flux could be increased by increasing the length l or decreasing the width w of the slots. Increasing internal inductive reactance by the structural means is the antithesis of a normal alternator design where efforts are made to reduce and/or minimize the internal reactance. As illustrated in FIG. 6, the second group of winding slots 212a, 212b are configured to have a minimum flux leakage n. This minimizes the inductive reactance of the power windings 70 and the field current generating windings 80 in the slots of the second group. In slots 212a, 212b, tooth tip areas 230, 232 are designed to minimize the internal inductive reactance. This leakage flux minimization configuration of the stacked laminations uses outwardly convex, curvilinear pole surfaces 234, 236. This configuration reduces the effective width d, also identified as width d, spacing d and distance d, of the the parallel facing surfaces so that only a selected outwardmost line defines the closest spacing between tooth tip piece 230, 232. The spacing of width d the entrant passage D for the second group of slots 212a, 212b. In practice, the spacing d is the same as the spacing of width c (FIG. 5) of entrant passages E in the first group of slots 210a, 210b. Of course, to further reduce the flux leakage, the spacing of width d for passage D of the second group of slots could be increased. This would increase the air gap between the tooth tips and, thus, the reactance between the tooth tips to reduce the flux leakage even further. In accordance with the preferred embodiment of the invention, the flux leakage shown pictorially as n in FIG. 6 and quantitatively designated as $L_A$ in FIG. 6 for the auxiliary windings varies as the ratio of b/d b/d is substantially less a/c. The leakage flux can be changed by modifying l and w of the slots.

In the preferred embodiment the spacing of widths c or d are the same and are approximately twice the depth b of tooth tip areas 230, 232. In practice spacing of width c and d is approximately 0.10–0.125 inches. In accordance with the invention and as shown in FIG. 5, the depth a is substantially greater than twice the depth b for minimum flux leakage and indeed, greater than three times the minimum depth b, where the width b is between 0.060 and 0.100 inches. In practice, the cylindrical surface of the stator has a diameter of approximately 5.0 inches and the second width is less than 0.100 and preferably about 0.060 inches. Depth a is approximately four times depth b. Depth b is a small dimension to minimize the flux leakage between the tooth tips. In practice, b is less than 0.100" and in the preferred embodiment b is about 0.060". Various configurations can be used to create the reactance of windings 60. The internal inductive reactance of windings 60 may be increased by other structural arrangements as already described. By shifting the windings 60 away from the internal cylindrical surface 202 of stator S a higher reactance is obtained. This increased spacing is illustrated in FIG. 4 wherein slots 210a, 210b have an innermost spacing u which is substantially greater than the intermost spacing v of slots 212a, 212b. By shifting the slots 210a, 210b radially outwardly from surface 202, the inductive reactance is increased for the windings 60. In the illustrated embodiment, the innermost spacing v is approximately 11/16" and the innermost spacing u is approximately 13/16". All these dimensions are illustrated to disclose the preferred embodiment of the invention, which is used in an alternator in an engine welder that produces 50–150 amperes of DC current for a welding operation. In this example, up to 125 amperes of output current does not require an external reactor 22 for a DC welding operation. The output current as adjusted by rheostat 86 is between 50 and 125 amperes. Above about 125-150 amperes, a small reactance in the form of an external reactor 22 may be needed. In the past, a machine of this example required a reactor having an overall dimension of approximately 7.0 inches by 6.0 inches with a depth of approximately 3.0 inches. This reactor weighed approximately 26 pounds when the alternator itself weighed approximately 58 pounds. By eliminating the need for external reactor 22, a 30% reduction of weight for the combination was realized.

In accordance with the invention, two different slot configurations are provided in the alternator. The welding current windings are placed in the slots which have been modified to increase the leakage current. This new engine welder construction envisions two types of slots in the stator. The use of separate and different slot shapes is novel. It is also novel to increase the leakage for the purpose of limiting or eliminating the need for an external reactor. Standard alternators are designed to reduce internal reactance. By changing the internal reactance of the alternator, the desired arc characteristics are controlled in the external circuit without the need for the large, heavy, costly external reactance.

By bringing the tooth tip areas 220, 222 closer together and having longer parallel surfaces 224, 226, the internal flux leakage is maximized. In accordance with another aspect of the invention, the tooth tips for the slots used for the field windings and the auxiliary power supply winding are also modified in a manner to reduce or decrease the leakage flux. The leakage in these slots 212a, 212b is thus minimized.

Figure 8:
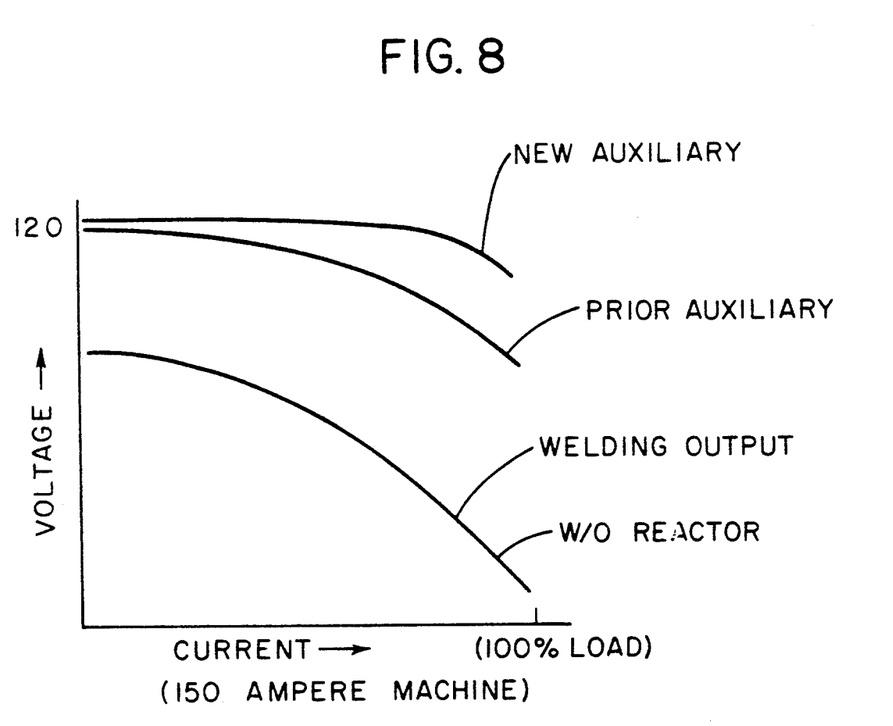

Referring now to FIG. 8, a voltage/current curve for an engine welder of 125-150 ampere size using the present invention is illustrated. No reactor from an external reactor 22 is employed; however, the main welding output curve has the desired droop. The welding output curve for the present invention is shown by the curve labeled "Welding Output" and also "W/O Reactor" i.e. welding output curve without reactor. If the auxiliary windings of the motor were not provided with a different leakage construction the power supply would also droop, as show in the curved labeled "Prior Auxiliary." The auxiliary output of the present invention is substantially constant over the full range of operation as shown in the upper curve of FIG. 8. This is shown by the curve labeled "New Auxiliary" in FIG. 8. FIG. 8 is to illustrate how a prior unit without a reduced auxiliary reactance would have an undesired droop as shown in the curve labeled "Prior Auxiliary" if the high leakage of the welding winding were used for all windings.

Having, thus, described the invention, it is claimed:

1. In an engine welder of the type comprising an output alternator having a rotor driven about a central axis with an outwardly facing cylindrical surface and a stator with a cylindrical surface generally matching said cylindrical surface of said rotor and containing a number of inwardly opening, circumferentially spaced, axially extending winding slots, a first group of said slots adapted to receive welding current windings and a second group of said slots adapted to receive auxiliary power current windings, each of said slots including an entrant passage defined by oppositely facing teeth areas, each passage extending radially from a slot to said stator's cylindrical surface, said first group of slots including said entrant passage thereof including structural means for causing a substantial increase in flux leakage therefrom as compared to the flux leakage from said second group of slots and said entrant passages thereof.

2. The improvement as defined in claim 1, wherein said structural means includes said entrant passage teeth areas having a first radially extending depth for said first group of slots and said entrant passage teeth areas having a second radially extending depth for said second group of slots with said first radially extending depth being substantially greater than said second radially extending depth.

3. The improvement as defined in claim 2, wherein areas for each of said first group of slots terminates at and defines spaced generally parallel, surfaces which face one another whereby said flux leakage is increased.

4. The improvement as defined in claim 1, wherein said teeth areas for each of said first group of slots terminates at and defines spaced, generally parallel, surfaces which face one another whereby said flux leakage is increased.

5. The improvement as defined in claim 4, wherein said teeth areas of each of said second group of slots terminate at and define a spaced surface, each spaced surface being outwardly convex and curvilinear, whereby said flux leakage is minimized.

6. The improvement as defined in claim 3, wherein said teeth areas of each of said second group of slots terminate at and define a spaced surface, each spaced surface being outwardly convex and curvilinear, whereby said flux leakage is minimized.

7. The improvement as defined in claim 2, wherein said depth of said entrant passages of said first groups of slots is at least 2.0 times the depth of entrant passages of said second group of slots second width.

8. The improvement as defined in claim 7, wherein said depth of said entrant passages of said first groups of slots is at least 3.0 times the depth of said entrant passages of said second group of slots.

9. The improvement as defined in claim 8, wherein said cylindrical surface of said stator has a diameter of approximately 5.0 inches and said depth of said entrance passages of said width is about 0.060 inches.

10. The improvement as defined in claim 8, wherein the depth of said entrant passages of said second group of slots is less than 0.100 inches.

11. The improvement as defined in claim 7, wherein the depth of said entrant passages of said second group of slots is less than 0.100 inches.

12. The improvement as defined in claim 2, wherein the depth of said entrant passages of said second group of slots is less than 0.100 inches.

13. The improvement as defined in claim 1, wherein said welder produces an output welding current in said welding current windings of 50-150 amperes with no external reactor.

14. The improvement as defined in claim 1, wherein said teeth areas of each of said second group of slots terminate at and define a spaced surface, each spaced surface being outwardly curved whereby said flux leakage is minimized.

15. The improvement as defined in claim 14, wherein said teeth areas of first group of slots terminate at and define spaced surfaces which extend inwardly from said cylindrical surface said stator for a first depth and said teeth areas of said second group of slots terminate at and define second spaced surfaces which extend inwardly from said cylindrical surface said stator for a second depth, and said first depth is substantially greater than said second depth.

16. The improvement as defined in claim 15, wherein said first depth is at least two times said second depth.

17. The improvement as defined in claim 15, wherein said first depth is at least three times said second depth.

18. The improvement as defined in claim 1, wherein said teeth areas of said first group of slots terminate at and define spaced surfaces which extend inwardly from said stator cylindrical surface for a first depth and said teeth areas of second group of slots terminate at and define second spaced surfaces which extend inwardly from said stator cylindrical surface for a second depth, and said first depth is substantially greater than said second depth.

19. The improvement as defined in claim 18, wherein said first depth is at least two times greater than said second depth.

20. The improvement as defined in claim 18, wherein said first depth is at least three times greater than said second depth.

21. The improvement as defined in claim 18, wherein said slots of said first group and said slots of said second group have substantially the same shape exclusive of said entrant passages of said slots.

22. The improvement as defined in claim 1, wherein said slots of said first group and said slots of said second group have substantially the same shape exclusive of said entrant passages of said slots.

23. The improvement as defined in claim 1, wherein said teeth areas of said first group of slots have an effective depth a, and are spaced from one another to define effective width c, and said spaced teeth areas for each slot of said second group have an effective depth b and are spaced from one another to define an effective surface width d wherein the flux leakage of the slots of said first group varies by the relationship of a/c, the flux leakage of the slots of said second group varies by the relationship of b/d and a/c is substantially greater than b/d.

24. The improvement as defined in claim 1, wherein the flux leakage of said slots varies directly with depth of said entrant passages and inversely with width of entrant passages and wherein the ratio of each entrant passage to each entrant passage width of said first group of slots is different from the ratio of each entrant passage depth to each entrant passage width of said second group of slots.

25. In an engine welder of the type comprising an output alternator having a rotor driven about a central axis with an outwardly facing cylindrical surface and a stator with a cylindrical stator surface generally matching said cylindrical surface of said rotor and containing a number of inwardly opening, circumferentially spaced, axially extending winding slots, a first group of said slots adapted to receive welding current windings and a second group of said slots adapted to receive auxiliary power current windings, each of said slots including an entrant passage defined by spaced tooth areas having a depth and a circumferentially extending width spacing therebetween, structural means for modifying said first group of slots to substantially increase flux leakage from said first group of slots as compared to the flux leakage from said second group of slots.

26. The improvement as defined in claim 25, wherein said structural means includes said tooth areas extending a first depth for tooth tips of said first group and a second depth for said tooth areas of said second group with said first depth being substantially greater than said second depth.

27. The improvement as defined in claim 25, wherein said teeth areas of each of said slots of said first group of slots have an effective tooth depth a and an effective width spacing c, said teeth areas of each slot of said second group have an effective tooth depth of b and an effective width spacing d wherein the flux leakage of the slots of said first group of slots varies by the relationship of a/c, the flux leakage of the slots of said second group varies by the relationship of b/d and a/c is substantially greater than b/d.

28. The improvement as defined in claim 25, wherein the flux leakage of the said slots varies directly with the depth of said entrant passages and inversely with the width of said entrant passages and wherein the ratio of said depth to each passage width of said first group of slots is different from the ratio of a passage depth to a passage width of said second group of slots.

* * * * *